Figure 1:
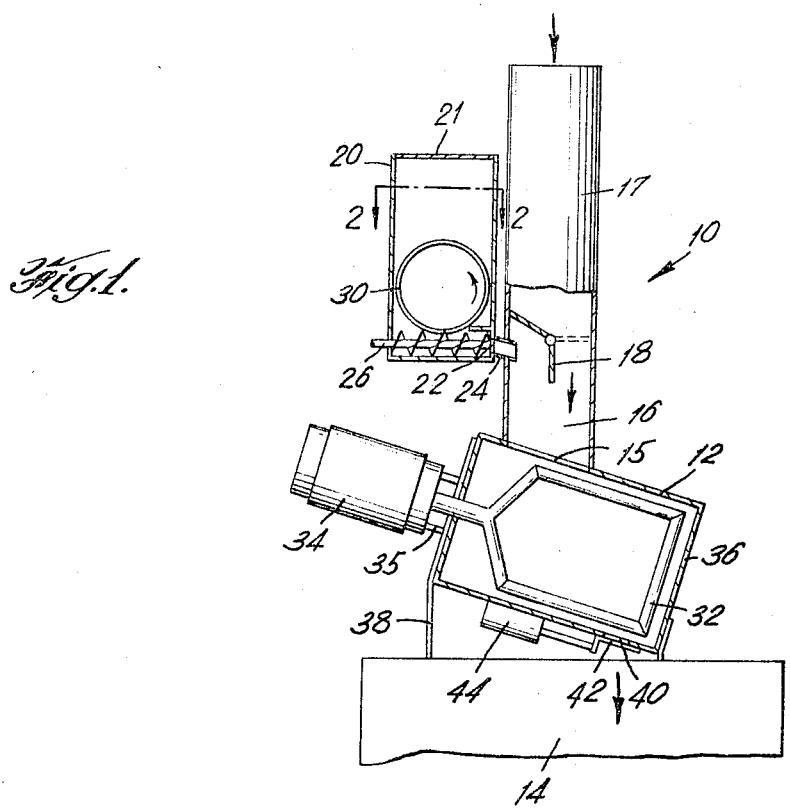

May 23, 1967  H. J. HARP  3,320,639
APPARATUS FOR BLENDING POWDERS
Filed Oct. 1, 1965

INVENTOR
HARRY J. HARP
BY Henry A. Marzullo Jr.
ATTORNEY

United States Patent Office 3,320,639
Patented May 23, 1967

3,320,639
APPARATUS FOR BLENDING POWDERS
Harry J. Harp, Jenkintown, Pa., assignor to Union Carbide Corporation, a corporation of New York
Filed Oct. 1, 1965, Ser. No. 491,970
7 Claims. (Cl. 18—30)

This invention relates to an apparatus for blending powders, and more particularly to an apparatus which permits the dry powder metering, blending and coloring of thermoplastic resinous materials, such as polystyrene, polyethylene, polypropylene and the like in controlled quantities at the point of use, such as, for instance, at the feed hopper of plastic molding equipment.

In the art of powder blending it is the customary practice to blend the pigment or colorant with the resinous charge prior to delivering the desired colored charge material to the machine hopper. This is almost invariably done with related color and resin mixing facilities which are usually separated and disposed apart from the plastic molding machines in special rooms. Some of the shortcomings of this prior art type of set-up are the inability to preclude contamination of the color charged resinous material since large inventories of various colored plastic (granular or pellet-shaped) materials must be maintained, lack of flexibility in handling such colored materials and the difficulty in changing from one color to another. The most critical problem, however, is the need to eliminate the generation of pigment dust, common with dry coloring operations. Dry color pigments are so very fine they pass through any known filter media used in industry today; moreover, if the material is handled by hand, then clouds of "smoke" created when the material is dispensed into the hopper permeates the entire building housing the set-up including every nook and corner. Accordingly, up until the instant invention there has been a long felt need for apparatus which will permit dry powder blending and coloring at the point of use and in a completely automated or semi-automated system capable of being sealed to various plastic molding machines such as, extruders, injection molding, blow molding machines and the like.

This invention, therefore, has as its principal object the provision of a novel apparatus which is so constituted and arranged as to be mutually cooperatively engageable with plastic molding equipment, for processing plastic resinous material, such as extrusion equipment, injection and blow molding equipment, and the like.

It is another object of this invention to provide improved mixing and feeding apparatus in which reground material and/or the natural, uncolored plastic granules or pellets and the dry colorant powder are accurately proportioned on a semi-continuous basis in a sealed or closed feeding system.

It is a further object of the invention to provide an apparatus which is so constituted and arranged in the form of a body or structure containing a pair of hoppers and a mixing device and that which is adapted or installed on a plastic molding machine which requires a constant level of material in the machine hopper.

It is still a further object of the invention, in addition to each of the foregoing objects, to provide a blending apparatus which is inexpensive and simple in construction and operation and one which minimizes any cleaning operation and which permits the quick change from one color to another color by simply exchanging one color storage and metering box for another.

It is yet still another object of the invention to provide a color plastic feed apparatus which is so constituted and arranged so as to be readily adaptable to be automatically energized or activated by a signal generated from a plastic molding machine upon sensing that the machine hopper requires additional colored plastic charge material.

It is yet another object of the invention to provide an apparatus which on a small batch basis uniformly colors plastic granules or pellets leaving no excess pigment or unutilized residue after coloring and which does not require the handling and storing of colored pellets or granules and which avoids the permeation and contamination problems heretofore common in the art.

In accordance with the above objects, the present invention is directed to the combination of a plastic "molding" or extrusion apparatus and an improved apparatus for metering, admixing, coloring and discharging particulate material wherein the colorant is separately dispensed from a colorant hopper box into a mixing chamber containing plastic granules to be colored, wherein the granules are measured prior to being dispensed into the mixing chamber and wherein the colorant can be readily changed by removing the colorant hopper box and attaching another colorant hopper box in place thereof.

Figure 2:
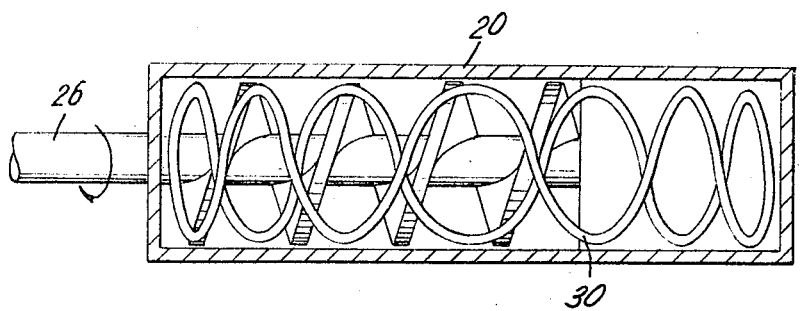

The above objects as well as other objects and advantages of the invention will become subsequently apparent in the details of construction and operation as more fully hereinafter described and claimed, reference being made to the accompanying drawing forming a part hereof, wherein like numerals refer to like parts throughout, and in which:

FIGURE 1 is a schematic view representing the improved apparatus of this invention, and FIGURE 2 is a greatly enlarged sectional view, taken along the line 2—2 of FIGURE 1 and showing the inner elements of the colorant hopper box.

Referring now more specifically to FIGURE 1 of the drawing, the numeral 10 designates the improved apparatus for carrying out the method of the invention. The apparatus 10 comprises essentially an inclined mixing chamber 12 supported, as will hereinafter be described in greater detail, by a suitable frame 14 (partially shown). The frame 14 is adapted to straddle and be suitably sealed to the sides of a hopper forming the feed inlet of the plastic "molding" apparatus (not shown) in which the plastic material can be heated and plasticized and formed into colored straws, stirrers, toothpicks, etc. The reground or natural plastic granules are dispensed through conduit 16 and opening 15 in the inclined mixing chamber 12 from a hopper or charger 17 as a predetermined meter charge measured on the basis of the volume thereof. The volume of the charger in the hopper 17 is predetermined and based on the cross-sectional area of the tube forming the hopper 17 and on the height of the same. A suitable valve, such as a manually or automatically operated swinging vane (butterfly) type of flapper valve 18 controls the discharge of the granules into the inclined mixing chamber 12. The colorant material in dry powder form is suitably stored in a separate hopper 20 removably secured to the framework 14 and is suitably dispensed into the mixing chamber 12 through means of discharge opening 22 and a short connecting conduit 24 which is disposed below the flapper valve 18 of charger 17. Hopper 20 is designed to be recharged since the top 21 is removable, and the hopper can function for a good number of cycles without recharging and it is also designed so as to be interchangeable with similar hoppers for enabling different colorants to be employed by the same apparatus without extensive preparation, cleaning or even the shut-down of the equipment.

It can thus be seen that dry colorant hopper 20 does not have to be cleaned but only needs to be refilled as needed and that colors can be quickly changed without "flushing." Very little "processed" material is lost as "off-color" scrap as a result of changing colors. To avoid the above scrap loss, one can replace the mixing chamber 12 and its associated blender blade and clean the "transition sections" between the colorant hopper box 20 and the mixing chamber 12 and below the mixing chamber. Of course, the mixing chamber 12 and its associated blender blade can also be cleaned rather than replaced by another set when shifting colors.

As best shown in FIGURE 2, the dry colorant material is dispensed from the hopper 20 by suitable conveying and metering means in the form of a feed screw or auger 26 located at the hopper bottom. The auger 26 is rotated intermittently for each batch of uncolored plastic granules to be colored and is suitably driven at a desired speed for a predetermined time interval by any suitable power source, such as a timing motor (not shown). One means for precluding the agglomeration, hanging up or compaction of the colorant powder and for ensuring full feed from the auger 26, is breaking means provided in hopper 20 comprising a suitable free floating, annular-shaped, continuous undulated meshing wire 30. This sinusoidal-shaped wire annulus 30 meshes with the auger 26 so that both the auger and wire annulus 30 turn simultaneously to respectively feed and unclog or break up the dry colorant powder. Other well known means for breaking and ensuring the uninterrupted flow of powder from the hopper 20, such as a tapper or vibrator, can also be employed in the apparatus of the invention.

For mixing the reground and/or natural uncolored plastic granules and the dry colorant material, a blender blade or agitator reel 32 which is employed in the mixing chamber 12 is suitably removably connected to a motor 34 by a suitable coupling (not shown). The reel 32 which can be additionally supported in a suitable manner by a bearing or bushing in the bottom wall or base 36 of mixing chamber 12 is driven at slow speed by the motor 34, suitably of a gear reduction type, which is secured by suitable mounting studs 35 to a plate or leg 38 forming a part of the general framework 14 of the apparatus 10. A discharge outlet 40 at the lower end of the inclined mixing chamber 12 is diagonally disposed with respect to the inlet opening 15. The mixing chamber 12 is suitably inclined at an angle from about 10 degrees to about 20 degrees with respect to the horizontal plane of the framework 14 so as to facilitate the proper and complete mixing and to completely discharge the material by gravitational means. A more preferred inclination is from about 13 degrees to about 17 degrees. For opening and closing the discharge outlet 40 of mixing chamber 12 upon the gravitational dump of the colored material into the hopper of a plastic molding machine, a suitable translatable slide gate valve 42 powered by suitable power means (hydraulic or pneumatic), such as a spring loaded or double acting power cylinder 44 is provided beneath the fixed mixing chamber 12. It should be noted that the design of the blender blade or agitator reel 32 is such so as to provide sufficient blending to uniformly coat all of the granules with the dry colorant powder and it is also noted that the blending and coloring upon completion leave substantially no dry color pigment remaining in the mixing chamber 12.

Instead of providing a slide gate valve 42, in lieu thereof a pivoted drop door could also be employed to permit the discharge of the colored granules from the mixing chamber 12. Of course, a suitable device, such as a power cylinder may be provided to close the drop door after discharge. It should also be understood that the invention is described as using gravitationally discharged uncolored plastic granules from hopper 17. However, such hopper 17 is merely exemplary and a suitable vacuum charger capable of batch charge metering can also be employed in place of the hopper 17. Reground or natural material can be disposed near the apparatus of the invention and can be manually or automatically fed by suitable well known means to the hopper 17. The apparatus can also be set up so as to receive material which is stockpiled far away from the apparatus by suitable pump and conveying means.

In the operation of the apparatus of the invention which if desired can be completely automated, the plastic molding machine equipped with a feed hopper having suitable sensing means "signals" that the hopper is in need of additional colored material. With the flapper valve 18 in its closed position the charger or hopper 17 is filled to the desired level with reground and/or natural uncolored plastic granules, and then the valve 18 is opened (rotated 90°) so as to dump the charge of granules into the mixing chamber 12. The dry colorant is then metered and introduced into the mixing chamber 12 while the blender is running and subsequently the motor 34 and reel 32 are actuated for a predetermined time cycle. After the mixing is accomplished the uniformly colored pelletized material which is uniformly surface coated or smeared with the dry pigment is deposited into the "signalling" hopper. This cycle is repeated until the hopper height switch (not shown) in the feed hopper of the plastic molding apparatus, which does the "signalling," indicates that the hopper is full or the cycle is repeated often enough to keep up with the usage of the molding machinery. Of course, a suitable sight glass or other visual means may also be employed in lieu of a hopper height switch to determine when the hopper requires additional material.

The following example illustrates the invention and is not intended to limit in any way the scope of the invention:

Polystyrene granules were dispensed into a "virgin" hopper measuring 5 inches in diameter and 24 inches in length and standard fine dry colorant powder as supplied to the trade was charged into a colorant hopper box measuring 2 x 5 x 12 inches. The granules measured on a volume basis and weighed 8 lbs. were then discharged into an inclined mixing chamber measuring 8 inches in diameter by 11 inches long and then dry colorant was dispensed into the mixing chamber. The reel blade of the mixer rotated at 30 r.p.m. for about 5 minutes and a uniformly colored charge was discharged into a feed hopper of a conventional screw type extrusion machine requiring about 8 "batches" per hour. The "charge" of dry colorant per "mixer" charge varies depending on the color depth desired.

What is claimed is:

1. In a system for supplying colored resinous material to a plastic molding machine for forming colored plastic objects comprising, in combination, first hopper means for natural plastic material having butterfly valve means for opening and closing the discharge opening thereof, second hopper means for a colorant having inlet and outlet ports disposed adjacent said first hopper means and communicating with said first hopper means below said valve means, an inclined mixing chamber having a beater removably connected to a drive shaft of means for driving said beater, said mixing chamber inlet and outlet ports diagonally disposed from each other, said inlet port of said mixing chamber being in communication with said discharge opening of said first hopper means and said outlet port being in communication with the feed hopper of said plastic molding machine, means for dispensing said colorant from said second hopper means to said first hopper means below said valve means, and a framework tieing said components together as a unit and sealing same to said plastic molding machine and said beater cooperating with the inner walls of said mixing chamber for uniformly coloring said natural plastic material.

2. The combination of an extruder for use in extruding plastic articles and a color blender attachment for coloring the natural resinous material supplied to the feed hopper of said extruder; said color blender comprising, in combination, a main supporting frame, an inclined cup-shaped blending chamber having a reel blade, releasably secured to said frame, said blending chamber having inlet and outlet ports diagonally disposed with respect to each other, a measuring chamber having inlet and outlet ports disposed contiguous to said blending chamber and secured thereto and to said frame, a colorant dispenser having an outlet port communicating with said measuring chamber adjacent said outlet thereof and being secured to said frame, the outlet port of said measuring chamber in communication with the inlet of said mixing chamber, drive means for rotating said reel blade within said blending chamber, means for advancing and dispensing said colorant from said outlet port of said colorant dispenser, and means for precluding the packing and agglomeration of said colorant in said colorant dispenser, said reel blade upon being rotated mixes said colorant and said natural resinous material so as to uniformly color same.

3. The combination of claim 1 wherein said means for dispensing said colorant comprises an undulating free floating wire breaker mutually cooperatively associated with an auger means for precluding the packing and agglomeration of said colorant and for dispensing same into said inclined mixing chamber.

4. The combination of claim 3 wherein said outlet port of said mixing chamber is provided with gate means for releasng said colored plastic material from said mixing chamber.

5. The combination of claim 4 wherein said gate means is translatable and is activated by a double acting powered cylinder.

6. The combination of claim 4 wherein said gate means is translatable and is activated by a one-way active power cylinder with a spring loaded return.

7. Apparatus for blending dry powdered material comprising first hopper means for introducing particulate material to be blended with said dry powdered material, an inclined mixing chamber including beater means having diagonally disposed inlet and outlet ports, said first hopper means beng arranged to discharge into said mixing chamber inlet port, valve means controlling flow of said particulate material operable to start and shut off material flow through said first hopper means, second hopper means detachably connected with said first hopper means for introducing metered flow of said dry powdered material between said valve means and said mixing chamber inlet port, said second hopper means comprising separate interchangeable hoppers enabling variation of the types of dry powdered materials to be introduced, said beater means cooperating with the inner walls of said mixing chamber to provide blended material at said mixing chamber outlet port.

References Cited by the Examiner
UNITED STATES PATENTS

| | | |
|---|---|---|
| 656,674 | 8/1900 | Stebbins. |
| 1,790,347 | 1/1931 | Hawkins _____ 107—4.2 |
| 2,304,382 | 12/1942 | Shoeld _____ 18—1 |
| 2,871,575 | 2/1959 | Du Pont. |
| 3,192,293 | 6/1965 | Van Riper _____ 18—12 X |

WILLIAM J. STEPHENSON, *Primary Examiner.*